United States Patent [19]
Nakamura et al.

[11] 3,817,125
[45] June 18, 1974

[54] TORQUE TRANSMISSION DEVICE

[75] Inventors: Kenya Nakamura; Nobuo Fukuma; Yoshito Kato, all of Aichi-ken, Japan

[73] Assignee: Toyota Jidosha Kogyo Kabushiki Kaisha, Toyota-shi, Aichi-ken, Japan

[22] Filed: July 18, 1972

[21] Appl. No.: 272,727

[30] Foreign Application Priority Data
July 21, 1971  Japan.............................. 46-53901

[52] U.S. Cl. ............................................... 74/798
[51] Int. Cl. .......................................... F16h 13/06
[58] Field of Search .................................... 74/798

[56] References Cited
UNITED STATES PATENTS

| | | | |
|---|---|---|---|
| 877,016 | 1/1908 | Tirrill | 74/798 |
| 922,827 | 5/1909 | Westinghouse | 74/798 |
| 1,071,719 | 9/1913 | Fast | 74/798 |
| 1,737,997 | 12/1929 | Garrard | 74/798 |
| 2,344,078 | 3/1944 | Brissonnet et al. | 74/798 |
| 3,060,767 | 10/1962 | Parrett | 74/798 |
| 3,160,026 | 12/1964 | Rosen | 74/801 X |
| 3,344,689 | 10/1967 | Naumann | 74/801 |
| 3,392,604 | 7/1968 | Hauptman | 74/798 |
| 3,425,301 | 2/1969 | Shannon | 74/801 |
| 3,459,072 | 8/1969 | Shannon | 74/801 |
| 3,475,993 | 11/1969 | Hewko | 74/798 |

*Primary Examiner*—Arthur T. McKeon
*Attorney, Agent, or Firm*—Toren & McGeady

[57] ABSTRACT

In an arrangement for transmitting rotating power between an input shaft and an output shaft by means of rolling friction, a plurality of cylindrical rollers are disposed around and in contact with the input shaft and are secured to the output shaft. An outer race is located radially outwardly of the rollers and is pressed radially inwardly into contact with the rollers so that the rollers are elastically deformed and a radial preload is effected on the outer race. The preload can be achieved by force-fitting the outer race into a casing or by inserting means between the casing and the outer race.

8 Claims, 8 Drawing Figures

PATENTED JUN 18 1974 3,817,125

TORQUE TRANSMISSION DEVICE

SUMMARY OF THE INVENTION

This invention relates to a torque transmission device and, more particularly, to an arrangement for transmitting large rotating power at reduced speed by utilizing friction.

To transmit large rotating power with minimum noise and vibration, use of improved friction transmission systems utilizing rolling friction has been proposed to replace conventional gear transmission systems. Such friction transmission systems usually comprise input side elements such as inner races, rollers and outer race, which are kept in contact with each other through a lubricant oil film, and a retaining axle which rotatably supports cylindrical rollers and is connected to the output side, so that the rollers are rolled along the outer race with the tractive force developed by the rotation of the inner races and the rolling movement of the rollers is transmitted through the retaining axle to the output side. Therefore, in the reduction gear of such friction transmission systems, elastic inter-contact of the elements such as inner races, rollers and outer race becomes a vitally important factor for the optimum operation of the system. To obtain the desired elastic contact utilizing such elastic lubrication theory, it is necessary to provide a radial preload at high accuracy and in a positive manner with a simple mechanism.

A primary object of the present invention is to provide a torque transmission device which is simple in structure and high in torque transmission efficiency.

According to the featured arrangement of the present invention, an outer race is forcibly fitted into an outer cylinder of a reduction gear to cause elastic deformation of the rollers and to provide thereby a radial preload between the inner races, rollers and outer race.

Other objects and advantages of the invention will become apparent from the following description of a preferred embodiment of the invention taken in conjunction with the accompanying drawings, in which:

DETAILED DESCRIPTION OF THE INVENTION

Figure 1:
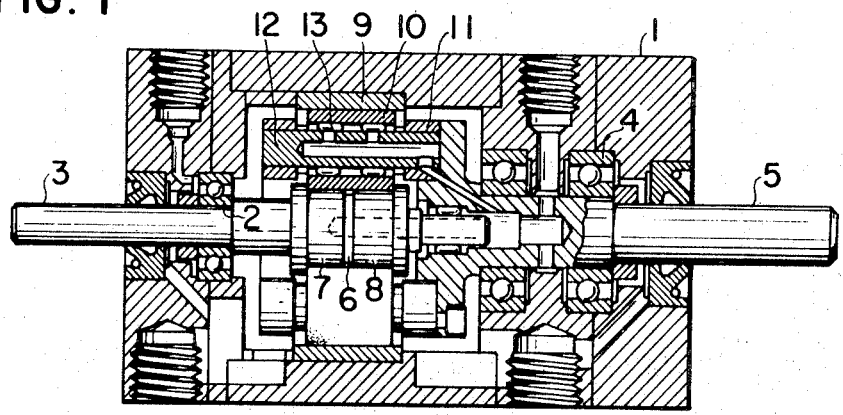
FIG. 1 is a sectional view of a reduction gear mechanism incorporating the present invention.

In FIG. 1 a reduction gear mechanism, in accordance with the present invention, is illustrated, the mechanism includes a cylindrical casing 1 lubricated by the oil in the mechanism, a rotatable input shaft 3 extending into the casing on one side, the input shaft is supported by a bearing 2 and is sealed to the casing by a suitable sealing means. On the opposite side a rotatable output shaft 5 extends out from the casing 1, the output shaft is arranged in axial alignment with the input shaft 3 and is supported by a bearing 4 on the side opposite from the bearing 2 and is sealed to the casing by a suitable sealing means.

The input shaft 3 has split cylindrical inner races 7 and 8 which are formed integral with it and the races are separated by an oil groove 6. On the inner periphery of the casing 1, in opposition to the inner races 7 and 8, there is a cylindrical outer race 9, and between the inner and outer races a plurality of hollow cylindrical rollers 10 is arranged in rollable contact with both the outer and inner races. The outer race 9 is forcibly pressed into the casing 1 so that it undergoes a slight resilient contraction. This forced contraction causes a corresponding resilient deformation of the rollers 10, diminishing the spaces between the contact parts of the inner races 7, 8, rollers 10 and outer race 9, and bringing them into mutual elastic contact, so that elastic lubrication is effected and a radial preload is imparted to the rollers 10. The output shaft 5 carries retaining means 11 and retaining axles 12 on which the rollers 10 are rotatably secured through needle bearings 13.

In the operation of the above described reduction gear of the present invention, when the input shaft 3 is placed into rotation, the rollers 10 undergo a planetary rotation along the outer race 9 by the tractive force of the inner races 7,8 while receiving rolling frictional resistance developed between rollers 10 and the outer race 9. Revolution of the rollers 10, effected during this movement, is transmitted to the output shaft 5 through the retaining axles 12, and, accordingly, there is obtained a reduction ratio determined by the outer diameter of inner races 7, 8 and the inner diameter of outer race 9 corresponding to the tooth number of a planetary gear mechanism. At the time of high-speed rotation, the centrifugal force of each roller 10 is lessened because it is hollow, resulting in marked improvement in its service life which is greatly affected by the pressure loading between the races 7,8,9 and rollers 10.

As described above, according to the transmission system of the present invention, the outer race 9 is forcibly fitted in the casing 1 by elastically contracting the race so as to give a corresponding preload to the rollers 10. In practice, such a fitting can be effected by various methods, and four such methods are explained hereinunder with reference to the corresponding figures.

Figure 2:
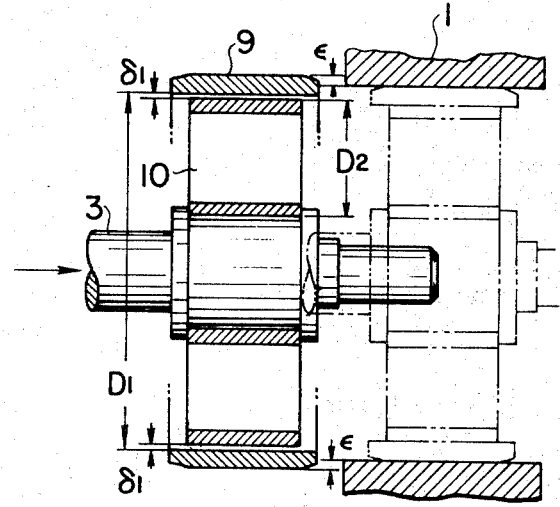
FIGS. 2 and 3 are schematic illustrations of the mechanism in which an outer race is directly forced into the outer cylinder.
Figure 3:
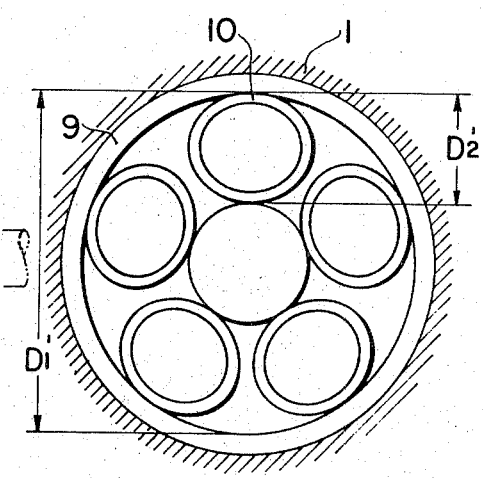

Referring first to FIGS. 2 and 3, there is shown the case where the outer race is pressed directly into the casing. In this case, a crowned effect is provided on the outer surface of the outer race 9 and the outer race is mounted in position relative to the input shaft 3 so that an initial space of $2\delta_1$, that is a difference in diameter between the inside diameter of the outer race and the diameter of the circle including the radially outer surfaces of the rollers 10, is formed between the outer race and the outer circle of the rollers 10. Then the outer race 9 is pressed into the casing 1 from one side thereof with fitted tolerance $2\epsilon$ provided between the casing and outer race. When thus pressed into position, the outer race 9 is shrunken, with its inner diameter reduced accordingly from $D_1$ (before fitting) to $D_1'$. Owing to the shrinkage of the outer race, the initial space $2\delta_1$ is filled up and as the rollers 10 are further elastically compressed radially by the outer race 9, they are deformed into an oval shape, with their outer diameters reduced accordingly from $D_2$ to $D_2'$. Consequently, an elastic restorative force is developed in the rollers 10 in the direction of inner races 7,8 and outer race 9 and, as a result, a preload is given to each of the contacting parts of the elements.

Figure 4:
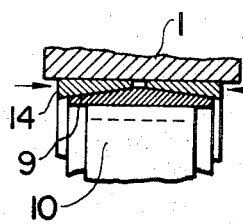
FIG. 4 is a partial sectional view of the device in which the outer race is fitted into the outer cylinder by making use of a morse taper.

In the embodiment of FIG. 4 where a morse taper is utilized, the outer periphery of the outer race 9 is tapered outwardly from its circumferential edges inwardly toward the center so that the outer race is loosely fitted into the casing 1. Thereafter, tapered members 14 are driven in between said outer race 9 and casing 1 to effect the contraction of the outer race 9.

Figure 5:
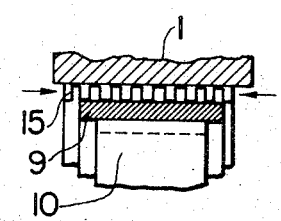
FIG. 5 is a view, similar to FIG. 4, showing an embodiment in which the outer race is fitted into the outer cylinder by utilizing bellows.

In the case of FIG. 5 where bellows are utilized, the outer race 9 is fitted into the casing 1 along with a corrugated member 15, and then the corrugated member 15 is compressed from both sides to contact the outer race 9.

Figure 6:
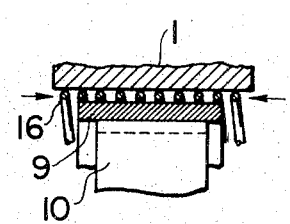
FIG. 6 is a further view, similar to FIG. 4, showing another embodiment in which the fitting of the outer race in the outer cylinder is effected by utilizing a compression spring.

In still another case shown in FIG. 6, a coil spring 16 is used instead of the corrugated member 15 of FIG. 5, the coil spring 16 is compressed to cause contraction of the outer race 9.

Figure 7:
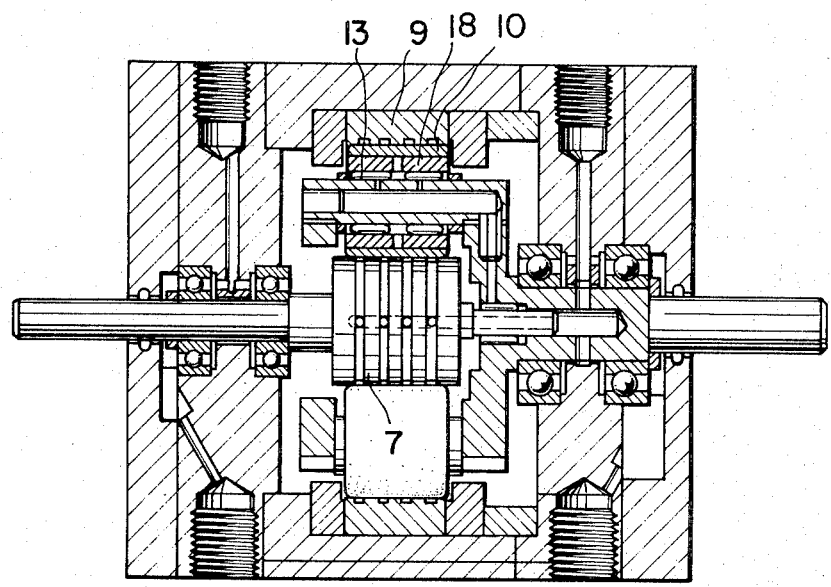
FIG. 7 is another view, similar to FIG. 1, showing a further embodiment in which needle bearings are held around retaining axles by bushes.
Figure 8:
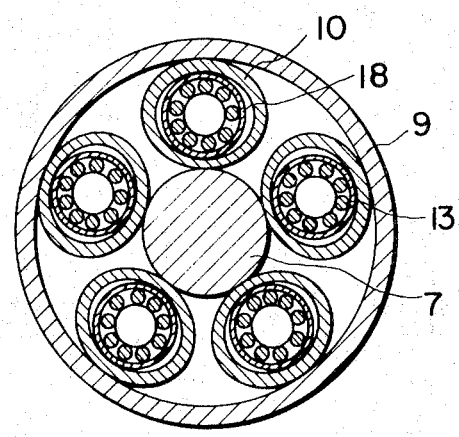
FIG. 8 is a cross-sectional view of the mechanism shown in FIG. 7.

In the embodiment of FIGS. 7 and 8, the needle bearings 13 are held around the retaining axles 12 by substantially rigid bushes 18. The bushes 18 serve to transmit the tractive force and also to exclude the influence of the resilient deformation of the rollers 10 on the needle bearings 13. In addition this arrangement permits a sufficient supply of lubricating oil to the spaces between the rollers 10 and the bushes 18.

As discussed above, according to the torque transmission device of the present invention, an elastic restorative force is produced in the rollers 10 by elastically deforming them and such restorative force provides a radial preload in a most ideal form and thereby ensures perfect slip free torque transmission with rolling friction. The present device is also advantageous structurally because few attachments are required for fitting the outer race 9 in the casing 1, without any attachment at all being needed in the case of direct press-fitting, and, hence, the possibility of any trouble or failure taking place in operation is minimized.

What is claimed is:

1. A torque transmission device comprising a rotatable input shaft and a rotatable output shaft arranged in axially aligned relationship with one another, inner races formed integrally on said input shaft and spaced apart in the axial direction, a plurality of hollow rollers disposed in an annular space radially outward from and enclosing the circumference of said inner races and each of said rollers disposed in contact with said inner races, a retaining axle positioned within and rotatably supporting each of said rollers and connected to said output shaft, an outer race disposed radially outwardly from and in surface contact with each of said rollers, and means disposed radially outwardly about and forcibly fitted over said outer race for applying a radially directed compressive force thereto so that said outer race undergoes a slight resilient contraction for pressing said outer race into contact with said rollers and effecting elastic deformation of said rollers and providing a radial pre-load on said outer race.

2. A torque transmission device, as set forth in claim 1, wherein said means includes a casing radially enclosing said outer race, said casing having the diameter of its inner surface in contact with the outer surface of said outer race smaller than the diameter of the outer surface of said outer race so that the casing is forcibly fitted onto and over said outer race.

3. A torque transmission device, as set forth in claim 1, wherein said means includes a casing radially enclosing said outer race, said casing having the diameter of its inner surface disposed in juxtaposition to the outer surface of said outer race larger than the diameter of the outer surface of said outer race for providing a space therebetween, and means positioned in the space between said casing and the outer surface of said outer race for applying the radially directed compressive force to said outer race.

4. A torque transmission device, as set forth in claim 3, wherein the outer surface of said outer race having a morse taper with its radially outer surface tapering radially outwardly from the opposite circumferential edges to an apex located intermediate the circumferential edges and said means positioned within the space between said casing and said race comprises a pair of tapered members each forcibly fitted from one circumferential edge into the space between said casing and said outer race for supplying the radially directed compressive force to said outer race.

5. A torque transmission device, as set forth in claim 3, wherein said means positioned within the space between said casing and said outer means comprises a bellows member which is fitted into the space and then is placed in a contracted condition for applying the radially directed compressive force to said outer race.

6. A torque transmission device, as set forth in claim 3, wherein said means positioned within the space between said casing and said outer race comprises a coil spring fitted into the space between said casing and said outer race and then contracted for applying the radially directed compressive force to said outer race.

7. A torque transmission device, as set forth in claim 1, wherein needle bearing means are positioned within each of said rollers in contact with said retaining axle therein for rotatably supporting said rollers on said retaining axle.

8. A torque transmission device, as set forth in claim 7, wherein substantially rigid bush means are positioned within each said roller between said needle bearing means and the inner surface of said roller for transmitting tractive force and excluding the influence of the resilient deformation of said rollers on said needle bearing means.

* * * * *